Patented Sept. 12, 1933

1,926,055

UNITED STATES PATENT OFFICE 1,926,055

CATALYST AND PROCESS OF EMPLOYING SAME

Julius A. Nieuwland, Notre Dame, and Richard R. Vogt, South Bend, Ind., assignors to E. I. du Pont de Nemours & Company, Wilmington, Del., a corporation of Delaware No Drawing. Application December 29, 1930 Serial No. 505,462

20 Claims. (Cl. 260—170)

This invention relates to improvements in the process for polymerizing acetylene. More particularly, it relates to improvements in the catalyst used to polymerize acetylene to highly unsaturated nonbenzenoid hydrocarbons.

Prior art

In an application of Julius A. Nieuwland, Serial No. 153,210, filed December 7, 1926, has been described a process for carrying out the polymerization of acetylene in the presence of a suitable catalyst to form unsaturated nonbenzenoid hydrocarbons such as vinylacetylene, divinylacetylene, $C_8H_8$, etc. In this process the acetylene is polymerized when introduced into a catalyst comprising a substantially saturated aqueous solution of a cuprous compound, such as cuprous chloride, finely divided copper and a nitrogen base such as ammonium chloride.

In an application of Calcott and Downing, Serial No. 303,494, filed September 1, 1928, is disclosed a method for the continuous production of acetylene polymers by the use of the non-acid catalyst discovered by Nieuwland. In the later application, acetylene is introduced continuously into the heated catalyst, the resulting polymers are continuously removed together with the unreacted acetylene, the entrained acetylene then separated and reintroduced into the catalyst.

The product resulting from polymerizing acetylene as disclosed in these prior applications is a mixture of higher hydrocarbons of the acetylene series containing divinylacetylene together with hydrocarbons of the general molecular formula $C_4H_4$ and $C_8H_8$. Monovinylacetylene, $CH_2=CH-C\equiv CH$, boiling range 4–8° C., has been definitely identified as a constituent of the product. These products may be separated by distillation.

In the above identified applications, the catalyst in its preferred form is defined as a substantially saturated aqueous solution of a cuprous salt, finely divided copper and an ammonium or tertiary amine salt. The application of Nieuwland, Serial No. 505,463, filed of even date herewith, discloses an improvement in the original aqueous catalyst to increase its working life which involves the addition of an inorganic acid in suitable concentration to the aqueous mixture. For the acid constituent which is the feature of that application an inorganic acid may be used which does not form a cuprous salt which is insoluble in a saturated aqueous solution of the amine or ammonium salt, to be used in the catalyst, and which acid has an ionization constant of $10^{-6}$ or greater. Mixtures of acids may be employed if desired. Such acids as the following can, for example, be used: hydrochloric, hydrobromic, hydriodic, sulfuric, phosphoric, etc. The acid should be added to the catalyst in sufficient quantity to form the salt with any free nitrogenous base present and in sufficient excess to establish an hydrogen ion concentration of greater than pH 6, but preferably not in excess of that quantity equivalent to any free amine which may be present plus a sufficient quantity of acid to furnish ionizable hydrogen equal to 0.2% of the weight of the cuprous copper in the system. Thus, if a catalyst be made containing 45 parts of cuprous copper (as 70 parts cuprous chloride) and the proper amount of water, copper powder and ammonium chloride, acid may be added to furnish not over 0.09 parts of ionizable hydrogen since there is no free amine in the system. The 0.09 parts of ionizable hydrogen might be furnished by 8.88 parts of commercial 37% hydrochloric acid, for example.

Improvement

The present invention has as an object the modification of the catalysts disclosed in these prior applications to make possible the production of even higher yields of the non-benzenoid acetylene polymers per unit weight of catalyst.

With this object in view, we have discovered that if a part or all of the water in the original catalyst (Nieuwland, Ser. No. 153,210) or in the acid Nieuwland catalyst, is replaced by means of an organic carboxylic acid of suitable strength, the production of the catalyst is greatly increased. The operation is carried out with the modified catalyst in the same manner as described by Nieuwland and by Calcott and Downing, as will appear from the following discussion and examples. It may, of course, be carried out by the continuous method or by the various modifications of the batch process, subject to all of the features, modifications and phases of the previous Nieuwland, and Calcott and Downing claims and disclosures.

Example I

A mixture containing 383 parts (by weight) of acetic acid, 427 parts of pyridine, 178 parts of cuprous chloride and 30 parts of finely divided copper powder, is aged for several hours and is then swept with acetylene in a closed system. When all of the air has been displaced, the system is closed and violently agitated, acetylene being continuously introduced to replace that which is absorbed. The color of the catalyst changes from yellow to brilliant red and the temperature gradually rises. The temperature may rise to 50–60° C. without causing trouble, but it is preferable to hold it down to about 25° C. by suitable cooling. When the reaction slows up, as shown by a decrease in the rate of absorption of acetylene, the operation is discontinued and the products removed from the catalyst by distillation. The distillate contains some unconverted acetylene, some pyridine and acetic acid from the catalyst but largely monovinylacetylene (B. P. apparently 4–8° C.), divinylacetylene, $C_8H_8$ and other noncyclic, nonbenzenoid hydrocarbons displaying a high degree of unsaturation.

The products in this distillate may be separated by fractionation; acetylene first coming off while the material is refluxed under a brine cooled dephlegmator; when the true vapor temperature has reached 5° C., a suitable lagged fractionating column being used, a fraction is collected between 5° and 10° C., which is essentially monovinylacetylene. After removal of monovinylacetylene, the temperature rises rapidly to 80° and a second cut is made from 80° to 90° which contains impure divinylacetylene; this may be purified by further fractionation or by washing with water to remove acetic acid and pyridine, followed by distillation. To obtain the higher members the residue should be washed with water to remove most of the pyridine and acetic acid and subjected to careful fractionation in vacuo. The catalyst may be cooled, the constituents which were lost during the distillation (namely pyridine and acetic acid) replaced and then reused, this cycle being repeated indefinitely.

Formic acid (80%) may be substituted for acetic in the above operation, using a molecular equivalent quantity. The products are not altered by the substitution.

*Example II*

The operation described in Example I may be repeated using 685 parts of commercial 85% lactic acid in place of the acetic acid. The method of operation and product are essentially the same.

*Example III*

The operation described in Example I may be repeated using a catalyst composed of 390 parts of acetic acid, 178 parts of cuprous chloride, 30 parts of copper powder, 400 parts of pyridine and 50 parts of pyridine hydrochloride. The method of operation and products are essentially the same.

*Example IV*

The operation described in Example I may be repeated using a catalyst composed of 178 parts of cuprous chloride, 30 parts of copper powder, 805 parts of diethylaniline and 325 parts of commercial (90%) formic acid. The method of operation and products are essentially the same as those obtained in Example I.

It will be understood that the conditions set forth in the above examples need not be adhered to rigidly. Thus, the proportions of the components of the catalyst mass may be varied widely and the operating temperature may be as high as 100° C. although temperatures not above 60° C., and especially in the continuous process between 40 and 60° C., are preferred. Air may or may not be present.

The presence of the copper powder is not essential. Its function is merely to insure that all of the combined copper is present in the cuprous form as substantial amounts of cupric copper causes undesirable side reactions. Cuprous salts such as chloride, bromide, iodide and cyanide may be employed in the preparation of the catalyst. Obviously, a mixture of cupric salt and a reducing agent may be substituted for the cuprous salt, but it is best to have all of the copper salt reduced before starting. A certain amount of the cuprous salt of the added acid will, of course, be formed in accordance with the law of balanced reactions.

Salts of ammonia or of tertiary amines are present in all preferred applications of this new catalyst; pyridine represents the preferred amine. In place of the ammonium or amine salt, free ammonia or amine may be added, or in fact any nitrogen base adapted to be neutralized and converted to a salt by the acid present as a feature of this invention. The following salts and nitrogen bases are among those which may be used for this purpose: ammonium chloride, ammonium bromide and tertiary amines such as pyridine and the hydrochlorides, hydrobromides, acetates and formates of pyridine, quinoline, diethylmetanilic acid, dimethylaniline, diethylaniline, quinaldine, etc. For the purpose of this invention a tertiary amine is defined as an amine compound in which the nitrogen is connected to two or three carbon atoms through three bonds.

It is not necessary that the amine constituent as originally added be a salt of the same acid as that which exists in the catalyst or that which forms the anion of the copper salt. Thus pyridine formate may be used in a catalyst containing cuprous bromide and free hydrochloric acid, three different anions therefore being present. It is desirable, for optima results, that the amount of ammonium or amine salt be sufficient to effect substantially complete saturation of the liquid phase and that the cuprous salt be more than sufficient for complete saturation. These conditions, however, are not essential.

In preparing the catalyst of the present invention, the water in the original Nieuwland catalyst is all or in part replaced by an organic carboxylic acid which, when added to the catalyst mixture, does not precipitate the cuprous copper as an insoluble salt, and which has an ionization constant of $10^{-6}$ or greater. Mixtures of organic acids may be employed for this purpose. Moreover, mixtures of organic acids with small amounts of inorganic acids and resulting from replacing all or a part of the water of the inorganic acid catalyst of Nieuwland with an organic acid may be used if desired as modifications of the catalyst. Any organic carboxylic acid meeting the above requirements such as the following may be used: acetic, chloracetic, formic, citric, tartaric, propionic, butyric, and lactic. The amount of acid present, for best results, but not necessarily, should not exceed an amount sufficient to form a saturated solution of the salts present and should be sufficient to establish a hydrogen ion concentration of at least pH 6. It should, however, be understood that any replacement of the water in the original aqueous catalyst by an organic acid will be accompanied by improved results.

As will appear from the examples, the quantity of water used in conjunction with this catalyst should be sufficient to insure convenient fluidity for agition (especially with solid acids) but it is preferred that it not be in excess of the quantity required to dissolve all of the cuprous salt. In the case of liquid acids, water frequently need not be added if the fluidity is sufficient for agitation, and the quantity present then is only that which is known to be present in commercial acids. Thus, in Example I, no water is added and the commercial glacial acetic acid used contains less than 1.5%.

A catalyst prepared from acetic acid and pyridine with cuprous chloride and copper will convert approximately ten to twenty times as much acetylene to higher boiling polymers as will an aqueous ammonium chloride or pyridine catalyst containing the same weight of copper. It is believed, but not proved, that the amine salts form a complex addition product with cuprous chloride and the rate of absorption (and reaction) of acetylene is determined in part by the solubility of the complex in the acid medium. On this basis, the organic acid may be functioning to improve the solubility of this complex cuprous salt in the catalyst mixture.

As already indicated, the method of carrying out the absorption in the above described processes may also be varied to a large extent. The acetylene may be introduced into the absorption mixture under pressure, and the pressure may be maintained upon such mixture for a suitable length of time to permit complete absorption and reaction. If desired, the reaction mixture may be kept at elevated temperatures to assist in carrying out the desired reactions.

In the continuous operation with this improved catalyst according to the process of Calcott and Downing, small amounts of the acid constituent may be vaporized together with the product and water, if such be present. In this event, the acid in the product must be determined and continuously replaced in the catalyst as appears from the Calcott and Downing application, Serial No. 303,494.

As many apparent and widely different embodiments of this invention may be made without departing from the spirit thereof, it is to be understood that we do not limit ourselves to the foregoing examples or descriptions except as indicated in the following claims.

We claim:

1. The method of producing from acetylene a hydrocarbon of higher molecular weight which comprises bringing the acetylene into contact with a liquid catalyst mixture prepared from a cuprous salt, a nitrogen base and an organic carboxylic acid (having an ionization constant of at least $10^{-6}$) in such excess of that amount equivalent to the base present as to establish a hydrogen ion concentration of at least pH 6, said acid being adapted to form a cuprous salt which is soluble in the mixture.

2. The method of producing from acetylene hydrocarbons of higher molecular weight which comprises bringing the acetylene into contact with a liquid catalyst comprising a cuprous salt, a compound of the class consisting of salts of ammonia and tertiary amines, and an organic carboxylic acid (having an ionization constant of at least $10^{-6}$) in such excess of that amount equivalent to the base present as to establish a hydrogen ion concentration of at least pH 6, said acid being adapted to form a cuprous salt which is soluble in the mixture.

3. The process of claim 2 wherein the catalyst contains free copper.

4. The process of claim 2 wherein a cuprous salt of the class consisting of cuprous chloride, cuprous bromide, cuprous iodide and cuprous cyanide is present.

5. The process of claim 2 wherein a salt of the group consisting of ammonium chloride, ammonium bromide, and salts of the tertiary amines is present.

6. The process of claim 2 wherein the acid is a member of the group consisting of acetic, chloracetic, formic, citric, tartaric, propionic, butyric and lactic acids.

7. The method of producing from acetylene hydrocarbons of higher molecular weight which comprises bringing the acetylene into contact with a liquid catalyst prepared from a quantity of cuprous chloride at least sufficient to substantially saturate the liquid phase an amount of a tertiary amine sufficient to effect substantial saturation of the liquid phase and a carboxylic acid of the group consisting of acetic, chloracetic, formic, citric, tartaric, propionic, butyric and lactic acids.

8. The method of producing from acetylene hydrocarbons of higher molecular weight which comprises bringing the acetylene into contact with a liquid catalyst prepared from a quantity of cuprous chloride sufficient to saturate the liquid phase, an amount of pyridine sufficient to effect substantial saturation of the liquid phase and an amount of acetic acid sufficient to establish a hydrogen ion concentration of at least pH 6.

9. The process of claim 2 wherein the acetylene is continuously introduced into the catalyst contained in a closed vessel at a temperature not above 60° C., the reaction products are continuously removed together with the unreacted acetylene, the entrained acetylene separated and reintroduced into the catalyst.

10. The process of claim 7 wherein water is a constituent of the liquid phase.

11. The process of claim 7 wherein an inorganic acid of the group consisting of hydrochloric, hydrobromic, hydroiodic, sulfuric and phosphoric acids is present.

12. The method of producing from acetylene hydrocarbons of higher molecular weight which comprises bringing the acetylene into contact with an aqueous catalyst mixture at a temperature of about 25° C. and prepared from substantially 383 parts (by weight) of acetic acid, substantially 427 parts of pyridine, substantially 178 parts of cuprous chloride and 30 parts of finely divided copper.

13. The process of claim 2 wherein the reaction is carried out in the absence of air.

14. The process of claim 2 wherein the resulting hydrocarbons are removed by distillation from the reaction mixture and separated by fractional distillation to obtain monovinylacetylene.

15. The process of claim 2 wherein the reaction is carried out in a closed vessel, the hydrocarbons are separated from the resulting mixture by distillation, and then subjected to fractional distillation to obtain monovinylacetylene.

16. A catalyst for acetylene reactions prepared from a cuprous salt, a compound of the class consisting of salts of ammonia and tertiary amines and an organic carboxylic acid (having an ionization constant of at least $10^{-6}$) in such excess of that amount equivalent to the base present as to establish a hydrogen ion concentration of at least pH 6, said acid being adapted to form a cuprous salt which is soluble in the mixture.

17. A catalyst for acetylene reactions comprising a substantially saturated solution prepared from cuprous chloride, a tertiary amine and an organic carboxylic acid of the class consisting of acetic, chloracetic, formic, citric, tartaric, propionic, butyric and lactic acids.

18. A catalyst for acetylene reactions comprising a mixture prepared from 383 to 390 parts (by weight) of acetic acid, from 400 to 427 parts of pyridine, from 0 to 50 parts of pyridine hydrochloride, substantially 178 parts of cuprous chloride and 30 parts of finely divided copper.

19. A catalyst for acetylene reactions comprising a mixture prepared from substantially 178 parts (by weight) of cuprous chloride, 30 parts of copper powder, substantially 805 parts of diethylaniline and 325 parts of formic acid (90%).

20. The catalyst of claim 18 in which the acetic acid is replaced by substantially 685 parts of lactic acid (85%).

JULIUS A. NIEUWLAND.
RICHARD R. VOGT.